TEMPERATURE COMPENSATED CAMERA TUBE TARGET SUPPLY

Filed July 10, 1958 2 Sheets-Sheet 1

Inventors
George H. Fathauer
Robert C. Johnson by Hill, Sherman, Meroni, Gross & Simpson Attys.

TEMPERATURE COMPENSATED CAMERA TUBE TARGET SUPPLY

Filed July 10, 1958 2 Sheets-Sheet 2

Inventors
George H. Fathauer
Robert C. Johnson
by Hill, Sherman, Meroni, Gross & Simpson Attys.

United States Patent Office 2,942,148

Patented June 21, 1960

2,942,148

TEMPERATURE COMPENSATED CAMERA TUBE TARGET SUPPLY

George H. Fathauer, Decatur, Ill., and Robert C. Johnson, Demotte, Ind., assignors to Thompson Ramo Wooldridge Inc., a corporation of Ohio Filed July 10, 1958, Ser. No. 747,642

5 Claims. (Cl. 315—31)

The invention relates to apparatus for controlling operating voltages applied to electron beam devices. More particularly, this invention relates to apparatus for varying the voltage applied to the target electrode of a television camera tube as an inverse function of temperature so as to maintain a constant video output signal amplitude from said camera tube independently of ambient temperature changes.

Where electron beam devices, such as a television camera tube, are used in applications which may involve substantial changes in ambient temperature, it has been found that the magnitude of the target electrode voltage applied to the tube must be changed as an inverse function of the temperature changes in order to maintain a constant amplitude of video output signal derived from the tube. If the target voltage is simply maintained constant while the ambient temperature varies, it has been found that the average level of video signal will become a function of these temperature changes and will impair the proper operation of the camera tube.

It is also known that the resistance of the focus coil commonly associated with such tubes will also vary as a function of temperature.

It is a feature of this invention to provide a circuit which corrects for both of these temperature variation effects by applying a constant current to the focusing coil and permitting the voltage across this coil to vary with variations in temperature. This variation of the voltage across the focus coil is then used to control the magnitude of the voltage applied to the target electrode so as to compensate for temperature changes. By this circuit, the constant current through the focus coil maintains the beam in focus independently of temperature changes and the varying voltage developed across the focus coil controls the magnitude of the target electrode voltage so that the amplitude of video output signal is also maintained substantially constant independently of temperature changes.

It is therefore an object of this invention to provide apparatus for varying the voltage applied to the target electrode of an electron beam device so as to maintain a constant amplitude of output signal derived from said device independently of ambient temperature changes.

It is a further object of this invention to provide apparatus for varying the voltage applied to the target electrode of a television camera tube as an inverse function of temperature to maintain a constant video output signal amplitude from the tube independently of the temperature changes.

It is a further object of this invention to provide a temperature compensated television camera tube target voltage supply utilizing the varying voltage across a constant current focus coil to vary the magnitude of the voltage applied to the target of the tube in a manner to compensate for ambient temperature changes.

While the novel and distinctive features of the invention are particularly pointed out in the appended claims, a more expository treatment of the invention, in principle and in detail, together with additional objects and advantages thereof, is afforded by the following description and accompanying drawings in which like reference characters are used to refer to like parts throughout and wherein:

Figures 1, 2:
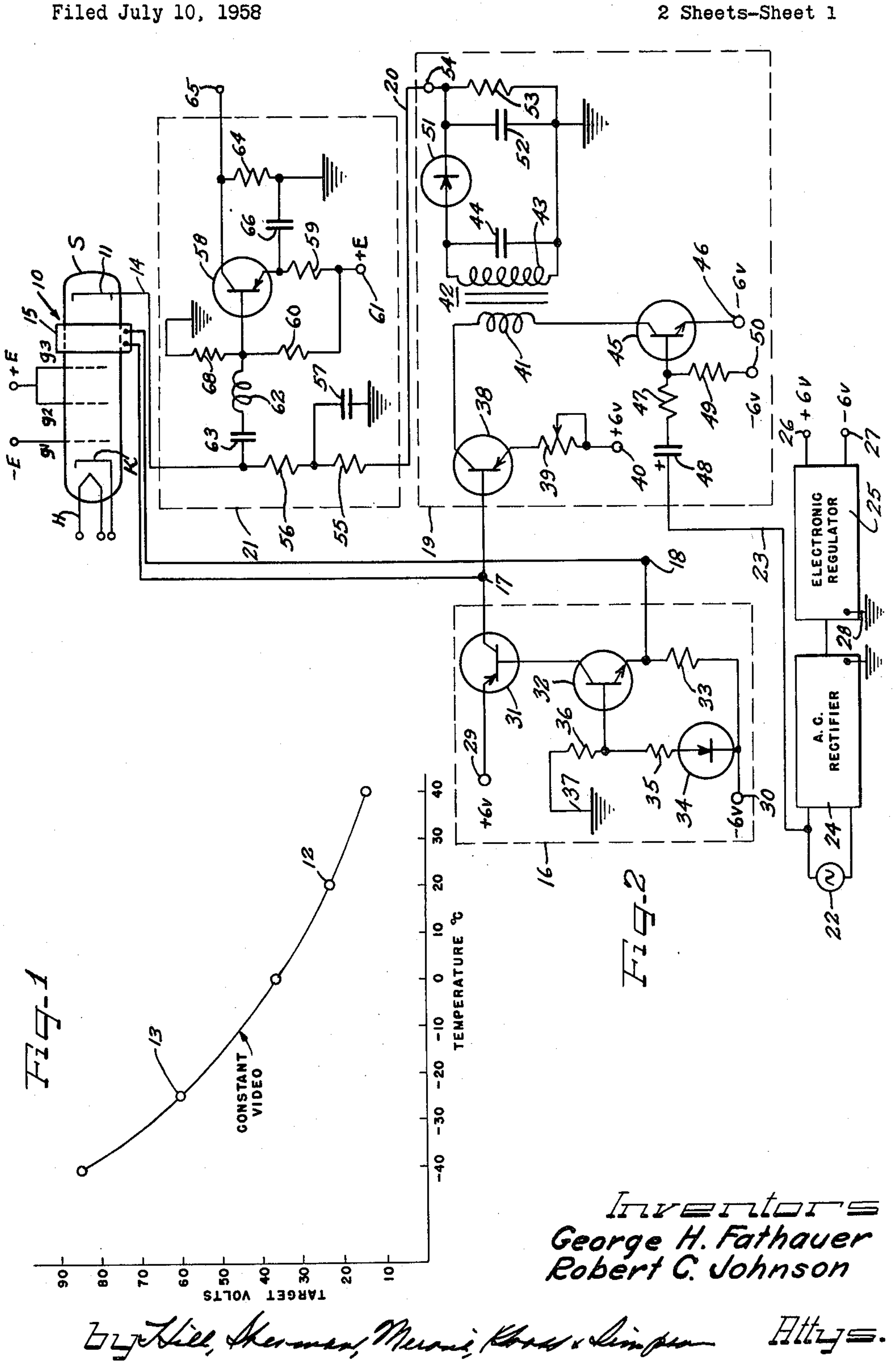
Figure 1 is a graph in which the abscissa represents temperature and the ordinate represents the magnitude of the target voltage required to maintain a constant video output signal from a typical television camera tube.
Figure 2 is a schematic circuit diagram of a temperature compensated camera tube target voltage supply of the present invention.

Turning now to the drawings, there is shown in Figure 1 a graph of a relationship which has been empirically found to obtain between ambient operating temperature plotted as the abscissa of the graph in degrees centigrade and the target voltage necessary to be applied, for example, to a vidicon television camera tube in order to maintain a constant amplitude of video output signal independently of the temperature changes. The graph shown in Figure 1 represents data which are typical of vidicon television camera tubes such as the tube 10 shown in Figure 2 which may, for example, be a type 6198A vidicon. The target electrode 11 of such a tube, of course, has a unidirectional operating or accelerating voltage applied to it and is the electrode from which video output signal is derived in a manner well known in the art. Where such tubes are used under conditions of substantial ambient temperature variation, as for example in airborne applications, it has been found that the unidirectional or operating voltage applied to the target electrode 11 must be varied as an inverse function of the ambient temperature in order to maintain the amplitude of the video output signal at a constant value for a constant light input.

As noted above, the necessary inverse relationship is illustrated in the graph of Figure 1. Of course it will be understood that the precise form of this relationship may vary from one type of camera tube or electron beam device to another and that the particular relationship shown in Figure 1 is given merely by way of illustration for one particular type of vidicon. If, for example, as shown at point 12 of Figure 1, the target voltage is adjusted to approximately 25 volts for a temperature of 20° C., then it will be observed that should the temperature fall to −20° C., it would be necessary to raise the target voltage to nearly 65 volts, as indicated by the point 13, in order to prevent the temperature change from affecting the overall level of amplitude of the video output signal. Of course it will be understood that the intensity of light input to the vidicon 10 will normally vary the instantaneous amplitude of the video output signal. The term "constant amplitude of video output signal" is used in this specification to mean such a constant amplitude as measured with a constant light intensity input to the tube.

In Figure 2 there is shown a temperature compensated camera tube target supply circuit which will vary the unidirectional operating voltage applied over wire 14 to the target electrode 11 as a function of variations of ambient temperature in a manner closely approximating over a considerable range of temperature variations the relationship shown in the graph of Figure 1. In the circuit of Figure 2 a focus coil 15 is supplied with current from a constant current source indicated by the circuitry within the dashed line block 16. The focus coil 15 surrounds a portion of the vidicon tube 10 and serves to generate a magnetic field which focuses the electron beam of the vidicon on the target electrode 11. The focus coil 15 may for example consist of turns of copper wire which has a positive temperature coefficient. Thus, as the ambient temperature decreases, the D.-C. resistance of the coil 15 will also decrease.

Since the constant current source 16 is such as to apply a constant current through the coil 15 regardless of the temperature or resistance changes in the coil, it follows that the voltage drop across the coil, that is to say the voltage between terminals 17 and 18, will also decrease as the temperature and resistance of the coil 15 decrease since the same current is flowing through a lower resistance. Conversely, if the temperature rises the resistance of the coil 15 will also rise as will the voltage between the points 17 and 18.

The voltage drop across the focus coil 15 is used as a bias to control the amplitude of the voltage applied to the input stage of the target voltage regulator indicated by the circuitry in the dashed block 19. The output of target voltage regulator 19 is applied over a wire 20 through a video amplifier output stage indicated by the circuitry within the dashed block 21 and thence over wire 14 to the target electrode of the vidicon 10.

The vidicon 10 is provided with the cathode K which, under the influence of a heater H, generates a beam of electrons which are controlled and accelerated in a conventional manner by the grids $G_1$, $G_2$ and $G_3$. The beam of electrons, as is well known in the art is focused by coil 15 on the target electrode 11 which in practice may be contiguous with or form a part of the viewing screen S of tube 10. Suitable operating potentials −E and +E, respectively, may be applied to the grids $G_1$ and the grids $G_2$, $G_3$. The operating or accelerating potential applied to the target electrode 11 is, as noted above, derived over wire 14, video amplifier 21, and line 20 from the output of the target voltage regulator 19.

Switching input to the target voltage regulator 19 may be derived from any convenient source 22 of alternating current voltage which, in one particular illustrative application, may for example have an amplitude of 6 volts. Output from the source 22 is applied over wire 23 to the input of the target voltage regulator for a purpose to be described below. Output from source 22 is also applied to a rectifier circuit 24 which in turn has its output applied to an electronic voltage regulator 25 which is in turn connected to supply a regulated voltage of +6 volts at the output terminal 26 and a regulated voltage of −6 volts at the output terminal 27. Voltage regulator 25 is provided with a ground connection 28 and the output from terminals 26 and 27 may be thus applied to various other input terminals in the circuitry which are indicated as being connected to + or −6 volts, respectively.

For example, terminals 29 and 30 of the constant current focus regulating circuit 16 would be connected respectively to terminals 26 and 27. Terminal 29 is in turn connected to the emitter of a P–N–P transistor 31. Transistor 31 may, for example, be a type 2N249 transistor. The collector of transistor 31 is connected to the terminal 17 of focus coil 15, whereas the base of transistor 31 is connected to the collector electrode of an N–P–N transistor 32. Transistor 32 may, for example, be a type 2N358 transistor. The emitter electrode of transistor 32 is connected to terminal 18 of focus coil 15 and is also connected through a resistor 33 to the terminal 30 which affords a regulator supply of −6 volts. A voltage dividing network consisting of a diode 34, a resistor 35, and a second resistor 36, are connected in series as shown between terminal 30 and a ground connection 37. The base electrode of transistor 32 is connected to the junction point of the resistors 35 and 36 as shown.

It will be obvious to those skilled in the art that if the resistance of the coil 15 decreases (due to a decrease in ambient temperature), there will be a tendency for the coil 15 to draw more current through the collector circuit of transistor 31, coil 15, and resistor 33 back to terminal 30. This in turn, however, will vary the voltage applied through resistor 33 to the emitter electrode of transistor 32 (the base electrode of which is held at a fixed voltage by the voltage divider network 34, 35 and 36) and thereby vary the current thru the collector of transistor 32. Of course, the collector of transistor 32 is directly connected to the base electrode of transistor 31 so that the variation of current at the collector electrode of transistor 32 will vary the base current applied thru transistor 31 in such a fashion as to counteract any tendency toward a change in the current flowing through the collector circuit of transistor 31. The circuit shown in the block 16 thus operates to maintain a constant current flowing through coil 15 independently of any changes in the resistance of coil 15 due to ambient temperatures.

It will, however, be noted that in the process of maintaining a constant current through coil 15 as the resistance of coil 15 changes, the voltage at the collector electrode of transistor 31 (which is directly connected to the terminal 17) with respect to the regulated +6 volts applied to terminal 29 will vary in direct proportion to the decrease of resistance of coil 15 and hence to a decrease in temperature. It will further be noted that the collector of transistor 31 and the terminal 17 of coil 15 are directly connected to the base electrode of a power transistor 38 in the target voltage regulating circuit 19. The emitter electrode of transistor 38 is connected through a variable resistor 39 to a terminal 40 to which a regulated +6 volt supply is also connected. The collector electrode of transistor 38 is connected to one end of the primary winding 41 of a transformer 42 having a secondary winding 43 which is tuned to resonance by a capacitor 44. The other end of the primary winding 41 is connected to the collector electrode of a switching transistor 45. The emitter electrode of transistor 45 is connected to a −6 volt terminal 46 and the base electrode of which is connected through a resistor 47 and capacitor 48 to the wire 23 which leads to the unregulated source of alternating current 22. The junction point of the resistor 47 and the base electrode of transistor 45 is connected through a resistor 49 to a terminal 50 which in turn may be connected to the regulated −6 volt supply.

It will be apparent that the alternating current voltage applied from source 22 over wire 23 through capacitor 48 and resistor 47 to the base electrode of transistor 45 will apply a varying bias to the transistor 45 so that it is alternately switched from a conducting to a non-conducting state. The ratio of the resistors 47 and 49 will of course determine the duty cycle or on time of the transistor 45. When the transistor 45 is in a conducting state, current may flow from terminal 40 through the emitter collector circuit of transistor 38, thence through the primary winding 41 of transformer 42, and finally through the emitter collector circuit of transistor 45 to the terminal 46. As the flow of this current is switched on and off by the bias signal derived from alternating current source 22 and applied to the base electrode of transistor 45, a pulsating unidirectional current will thus flow in the primary winding 41 of transformer 42. The flow of this pulsating unidirectional current in primary 41 will, by normal transformer action, induce an alternating current voltage in the secondary winding 43 of transformer 42. Capacitor 44 is connected across the secondary winding and is preferably of such a value as to tune the secondary winding to resonance at the frequency of the switching signal derived from A.-C. source 22. Transformer 42 is preferably a voltage step-up pulse transformer. Since the flow of current through the primary winding 41 controls the magnitude of the voltage induced in the secondary winding 43, it is apparent that a manual adjustment of the magnitude of this voltage may be made by adjusting the variable resistor 39 which in turn controls the current flowing through transistor 38 to the primary winding 41.

A rectifier circuit comprising a diode 51 having one terminal connected to a first end of the secondary winding 43 and another terminal connected through the parallel combination of a capacitor 52 and resistor 53 to the other end of the secondary winding provides a filtered unidirectional output voltage at terminal 54. The magnitude of the unidirectional voltage at terminal 54 will of course be determined by the magnitude of the alternating current voltage appearing across the secondary winding 43 in a manner well known in the art. As noted above, the magnitude of the alternating current voltage on secondary 43 is in turn determined by the bias voltage applied to the base electrode of transistor 38 which is in turn determined by the resistance of focus coil 15 which varies as a direct function of temperature. Of course, it will be appreciated that the phase reversal which occurs through transistor 38 results in the magnitude of the unidirectional voltage appearing at the terminal 54 varying as an inverse function of temperature rather than as a direct function of temperature as is the case with the resistance of the focus coil 15. The unidirectional voltage appearing at the terminal 54 is applied over wire 20, through the series connected resistors 55 and 56 of the video amplifier 21 and thence over the wire 14 to the target electrode of the vidicon or other camera tube 10. It is thus seen that the voltage applied to the target electrode 11 will vary as an inverse function of temperature and affords a close linear approximation to the curve shown in the graph of Figure 1 over a substantial range of ambient temperatures.

The video amplifier shown in dash line block 21 includes the resistors 55 and 56 which are connected in series between the output terminal 54 of the target voltage regulator and the target electrode 11 of vidicon 10 by wires 20 and 14. A decoupling capacitor 57 is connected from the junction point of resistors 55 and 56 to ground. The transistor 58 of the video amplifier stage has its emitter electrode connected through a resistor 59 and further has its base electrode connected through a resistor 60 to a terminal 61 to which a suitable source of positive operating potential may be applied. The base electrode of transistor 58 is also connected through a resistor 68 to ground. The transistor 58 may, for example, be a type 2N346 transistor and has its base electrode connected through an inductor 62 and capacitor 63 to wire 14 which directly connects to the target electrode 11. Video output signal is derived at terminal 65 across a resistor 64 which is connected between the collector of transistor 58 and ground. A capacitor 66 is also connected between the emitter of transistor 58 and the same ground connection.

In the particular exemplary embodiment which has been discussed above, and for which the transistor type numbers and vidicon type number have been given, the other components used in the various circuits may for example have the following values. Focus coil 15, 130 ohms resistance; resistor 35, 1000 ohms; resistor 36, 3000 ohms; resistor 33, 20 ohms; capacitor 48, 2 microfarads; resistor 47, 2700 ohms; resistor 49, 6800 ohms; resistor 39, 500 ohms full scale; transformer 42, 13 to 1 voltage step-up pulse transformer; capacitor 44, 0.003 microfarads; capacitor 52, 2 microfarads; resistor 53, 470,000 ohms; resistor 55, 10,000 ohms; resistor 56, 100,000 ohms; capacitor 57, 2 microfarads; capacitor 63, 0.022 microfarad; inductor 62, 36 microhenrys; resistor 68, 100,000 ohms; resistor 60, 220,000 ohms; resistor 59, 12,000 ohms; capacitor 66, 15 microfarads; resistor 64, 4700 ohms; diode 34, type SG22; diode 51, type 1N487; all other components being as indicated in the above discussion.

Figure 3:
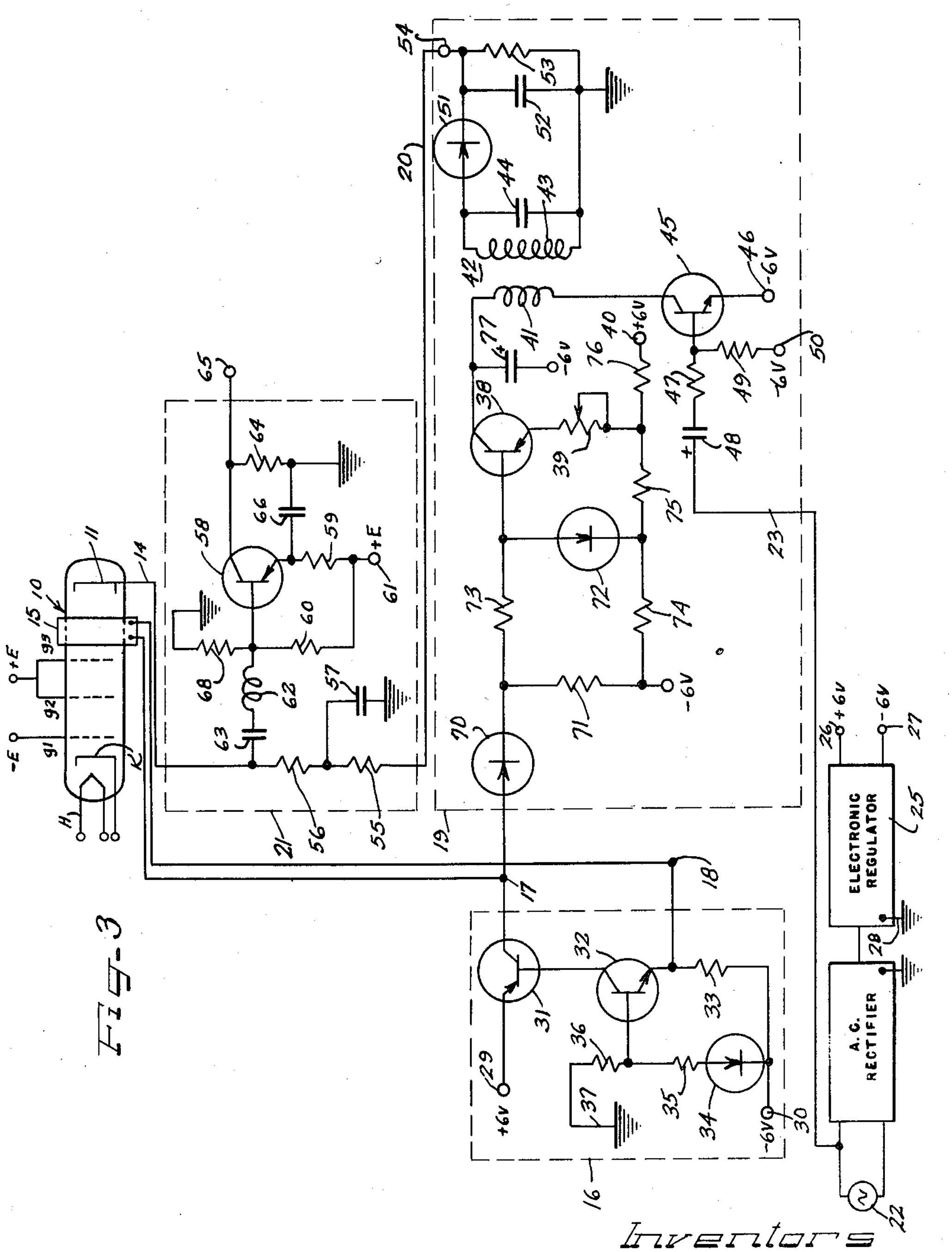
Figure 3 is a schematic circuit diagram of a modification of the circuit of Figure 2.

In Figure 3 there is shown a schematic circuit diagram of a modification of the circuit of Figure 2 including two further refinements. The elements in the circuit of Figure 3 which have already been discussed in connection with the circuit of Figure 2 are indicated by the same reference numerals used in Figure 2 and will not be further discussed in detail. The first of the two refinements added to the circuit of Figure 2 in the circuit of Figure 3 is a means for compensating for the charge in contact potential with temperature of the emitter-base diode of transistor 38. This is achieved by the addition of diode 70 which is forward biased by resistor 71. By being connected in series with the source and the input to transistor 38, the contact potential of diode 70 in effect bridges out the contact potential of the base to emitter junction of transistor 38 and compensates for the effects of temperature change thereon.

The second additional feature shown in Figure 3 is circuitry to further shape the target voltage versus temperature response curve of the output of target voltage regulator 19 to more nearly match the ideal or required characteristic shown in the graph of Figure 1. As noted above, the normal behavior of the circuit of Figure 2 is to provide an essentially linear approximation to the essentially logarithmic curve shown in Figure 1. While such an approximation is adequate for many applications, the response of the circuit may be caused to more nearly approach the ideal characteristic shown in Figure 1 by means of the additional circuit elements shown in the circuit of Figure 3.

In order to cause the output of the target voltage regulator 19 to more closely approach the desired logarithmic shape, diode 72 is added in combination with the source impedance such as resistor 73, and the biasing arrangement including resistors 74 and 75 such that as the top end of the focus coil 15 becomes more positive with rising temperature, the diode 72 has a greater shunting effect upon this voltage as applied to the base of transistor 38 thereby tending to level out the voltage curve as temperature increases.

It will be noted that compensating diode 70 and resistor 73 are connected in series between the collector of transistor 31 and the base of transistor 38. Resistor 71 is connected between the junction point of diode 70 and resistor 73 and a source of −6 volts. A voltage divider network comprising resistors 74, 75, and 76 is connected between the source end of resistor 71 and a second source of +6 volts. Diode 72 is connected between the base electrode of transistor 38 and the junction point of resistors 74 and 75 while potentiometer 39 is connected between the emitter electrode of transistor 38 and the junction point of resistors 75 and 76. Capacitor 77 is connected from the collector of transistor 38 to a source of minus 6 volts in order to maintain D.-C. conditions for the control circuit as transistor 45 is turned off and on by the A.-C. signal.

In one particular exemplary embodiment of the circuit of Figure 3 wherein the components common to the circuit of Figure 2 had the values given in connection with the discussion of Figure 2 above, the additional components in Figure 3 had the following values. Diode 70, type S320G; diode 72, type 1N128; resistor 73, 470 ohms; resistor 71, 4.7 kilohms; resistor 74, 1.5 kilohms; resistor 75, 180 ohms; resistor 76, 150 ohms; capacitor 77, 75 microfarads.

While particular exemplary circuits constructed by using components having the foregoing values have been found to give particularly satisfactory results, it will, of course, be understood that the values stated for the components of the circuits of Figures 2 and 3 are given by way of illustration only and are not intended to limit the scope of the invention. As will be apparent to those skilled in the art, any suitable constant current source could be applied to a focus coil such as the coil 15 the resistance of which varies as a function of temperature. Furthermore, although the particular target voltage regulator circuits shown as the block 19 have been found in practice to have numerous advantages and may readily be controlled by the voltage drop across the coil 15, it will none the less be understood that the change of voltage across the coil 15 with temperature could be used to control other equivalent target supply circuits so as to apply to the target electrode of an electron beam device a voltage which varies as an inverse function of temperature in order to maintain a constant video signal output from the electron beam device.

While the principles of the invention have now been made clear, there will be immediately obvious to those skilled in the art many modifications in structure, arrangement, proportions, the elements and components used in the practice of the invention and otherwise which are particularly adapted for specific environments and operating requirements without departing from those principles.

We claim as our invention:

1. Apparatus for varying the voltage applied to the target electrode of a television camera tube as an inverse function of temperature to maintain a constant video output signal amplitude from said tube comprising, means in said camera tube to generate a beam of electrons, a focus coil associated with said tube to focus said beam of electrons on said target electrode, said focus coil having a resistance which changes as a direct function of temperature, a constant current source connected to apply a constant current to said focus coil independently of said resistance changes, a rectifier circuit having a unidirectional output voltage connected to said target electrode, means to apply an input voltage to said rectifier circuit, means connected to vary the amplitude of said input voltage in response to variations in the voltage drop across said focus coil so as to vary the magnitude of said unidirectional output voltage applied to said target electrode as an inverse function of temperature.

2. Apparatus for varying the voltage applied to the target electrode of a vidicon television camera tube as an inverse function of temperature to maintain a constant amplitude of video output signal derived from said target electrode comprising, means in said tube to generate a beam of electrons, a focus coil associated with said tube to focus said beam of electrons on said target electrode, said focus coil having a resistance which changes as a direct function of temperature, a focus regulator circuit comprising a constant current circuit connected to apply a constant current to said focus coil independently of temperature changes, a target regulator circuit comprising, a transformer, means to apply a pulsating unidirectional current to said transformer, means to vary the amplitude of said pulsating unidirectional current in response to voltage changes across said focus coil, a rectifier circuit connected to the secondary winding of said transformer, and means to apply the output of said rectifier circuit to said target electrode of said television camera tube.

3. An apparatus for varying the voltage applied to the target electrode of a vidicon television camera tube as an inverse function of temperature to maintain a constant amplitude of video output signal derived from said target electrode comprising, means in said tube to generate a beam of electrons, a focus coil associated with said tube to focus said beam of electrons on said target electrode, said focus coil having a resistance which changes as a direct function of temperature, a focus regulator comprising a constant current circuit connected to apply a constant current to said focus coil independently of temperature changes, a target regulator circuit comprising a voltage step-up transformer having primary and secondary windings, a power transistor stage connected in circuit with a first end of said primary winding and a switching transistor stage connected in circuit with a second end of said primary winding, means to apply an alternating current bias signal to said switching transistor to produce a pulsating unidirectional current in the primary winding of said transformer, means connecting the voltage derived across said focus coil to bias said power transistor to vary the amplitude of said pulsating unidirectional current in inverse relation to the amplitude of said voltage across said focus coil, a rectifier circuit connected across the secondary winding of said step-up transformer, and means to apply the unidirectional output voltage of said rectifier circuit to said target electrode of said vidicon tube.

4. An apparatus for varying the voltage applied to the target electrode of a vidicon television camera tube as an inverse function of temperature to maintain a constant amplitude of video output signal derived from said target electrode comprising, means in said tube to generate a beam of electrons, a focus coil associated with said tube to focus said beam of electrons on said target electrode, said focus coil having a resistance which changes as a direct function of temperature, a focus regulator comprising a constant current circuit connected to apply a constant current to said focus coil independently of said temperature changes, a target voltage regulator circuit comprising a step-up transformer having primary and secondary windings, a power transistor stage connected in circuit with a first end of said primary winding and a switching transistor stage connected in circuit with a second end of said primary winding, means to apply an alternating current bias signal to said switching transistor to produce a pulsating unidirectional current in the primary winding of said transformer, means connecting the voltage derived across said focus coil to the base electrode of said power transistor to bias said transistor to vary the amplitude of said pulsating unidirectional current in inverse relation to the amplitude of said voltage across said focus coil, a diode connected in shunt relationship with the emitter-base junction of said power transistor, said diode being biased to modify said inverse relation to approximate a logarithmic function, and means to apply a unidirectional voltage derived from the secondary winding of said step-up transformer to said target electrode of said vidicon tube.

5. An apparatus for varying the voltage applied to the target electrode of a vidicon television camera tube as an inverse function of temperature to maintain a constant amplitude of video output signal derived from said target electrode comprising, means in said tube to generate a beam of electrons, a focus coil associated with said tube to focus said beam of electrons on said target electrode, said focus coil having a resistance which changes as a direct function of temperature, a focus regulator comprising a constant current circuit connected to apply a constant current to said focus coil independently of temperature changes, a target regulator circuit comprising a voltage step-up transformer having primary and secondary windings, a power transistor stage connected in circuit with a first end of said primary winding and a switching transistor stage connected in circuit with a second end of said primary winding, means to apply an alternating current bias signal to said switching transistor to produce a pulsating unidirectional current in the primary winding of said transformer, a first diode and a resistor connected in series between one end of said focus coil and the base electrode of said power transistor to apply the voltage appearing across said focus coil to bias said power transistor to vary the amplitude of said pulsating unidirectional current in inverse relation to the amplitude of said voltage across said focus coil, a second diode connected in shunt circuit relationship with the emitter-base junction of said power transistor, said second diode being biased to modify said inverse relation to approximate a logarithmic function, a rectifier circuit connected across the secondary winding of said step-up transformer, and means to apply the unidirectional output voltage of said rectifier circuit to said target electrode of said vidicon tube.

References Cited in the file of this patent

UNITED STATES PATENTS

| | | |
|---|---|---|
| 2,430,331 | Galella et al. | Nov. 4, 1947 |
| 2,555,147 | Meagher | May 29, 1951 |